United States Patent
Zhu et al.

(10) Patent No.: US 11,919,076 B2
(45) Date of Patent: Mar. 5, 2024

(54) FABRICATION OF 3D-PRINTED COPPER BASED ZINC ANODES

(71) Applicant: LAWRENCE LIVERMORE NATIONAL SECURITY, LLC, Livermore, CA (US)

(72) Inventors: Cheng Zhu, Livermore, CA (US); Eric B. Duoss, Dublin, CA (US); Zhen Qi, Tracy, CA (US); Anthony W. Van Buuren, Livermore, CA (US); Marcus A. Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 16 days.

(21) Appl. No.: 17/457,834

(22) Filed: Dec. 6, 2021

(65) Prior Publication Data

US 2023/0173579 A1 Jun. 8, 2023

(51) Int. Cl.
| | |
|---|---|
| *B29C 67/00* | (2017.01) |
| *B22F 10/18* | (2021.01) |
| *B22F 10/64* | (2021.01) |
| *B33Y 40/20* | (2020.01) |
| *B33Y 70/00* | (2020.01) |
| *C09D 11/52* | (2014.01) |
| *C25D 1/00* | (2006.01) |
| *B33Y 10/00* | (2015.01) |
| *B33Y 30/00* | (2015.01) |

(52) U.S. Cl.
CPC ............. *B22F 10/18* (2021.01); *B22F 10/64* (2021.01); *B33Y 40/20* (2020.01); *B33Y 70/00* (2014.12); *C09D 11/52* (2013.01); *C25D 1/00* (2013.01); *B33Y 10/00* (2014.12); *B33Y 30/00* (2014.12)

(58) Field of Classification Search
CPC .......... B22F 10/18; B22F 10/64; B33Y 10/00; B33Y 30/00; B33Y 40/20; B33Y 70/00; C09D 11/52; C25D 1/00
See application file for complete search history.

(56) References Cited

PUBLICATIONS

Rocha et al. ("Multimaterial 3D Printing of Graphene-Based Electrodes for Electrochemical Energy Storage Using Thermoresponsive Inks", ACS Appl. Mater. Interfaces, 2017, 9, 37136-37145) (Year: 2017).*
Liu et al. ("Hierarchical CuO@ZnCo—OH core-shell heterostructure on copper foam as three-dimensional binder-free electrodes for high performance asymmetric supercapacitors", Journal of Power Sources, 2020, 465, 228239) (Year: 2020).*
3D Inks LLC (http://www.3dinksllc.com/new-page-1) (Year: 2019).*

(Continued)

*Primary Examiner* — Ryan M Ochylski
(74) *Attorney, Agent, or Firm* — James S. Tak

(57) ABSTRACT

The production of a porous copper-zinc structure includes providing copper ink, creating a 3D model of the porous copper-zinc structure, 3D printing the copper ink into a porous copper lattice structure using the 3D model, heat treatment of the porous copper lattice structure producing a heat treated porous copper lattice structure, surface modification of the heat treated porous copper lattice structure by nanowires growth on the heat treated porous copper lattice structure producing a heat treated porous copper lattice structure with nanowires, and electrodeposition of zinc onto the heat treated porous copper lattice structure with nanowires to produce the porous copper-zinc structure.

20 Claims, 7 Drawing Sheets

(56) References Cited

PUBLICATIONS

Abd-Elnaiem et al. ("Fabrication, Characterization and Photocatalytic Activity of Copper Oxide Nanowires Formed by Anodization of Copper Foams", Materials, 2021, 14, 5030) (Year: 2021).*

Mooraj et al., "Three-dimensional hierarchical nanoporous copper via direct ink writing and dealloying," Scripta Mater. 177 (2020): pp. 146-150.

Nguyen et al., "3D-Printed Transparent Glass," Adv. Mater. 29.26 (2017): 1701181, pp. 1-5.

Sun et al., "Hierarchical 3D electrodes for electrochemical energy storage," Nat. Rev. Mater. 4.1 (2019): pp. 45-60.

Yao et al., "Efficient 3D Printed Pseudocapacitive Electrodes with Ultrahigh MnO2 Loading," Joule 3.2 (2019): 459-470.

Zhu et al., "3D printed functional nanomaterials for electrochemical energy storage," Nano Today 15 (2017): pp. 107-120.

Zhu et al., "Toward digitally controlled catalyst architectures: Hierarchical nanoporous gold via 3D printing," Sci. adv. 4.8 (2018): eaas9459, pp. 1-8.

Zhu et al.< "Supercapacitors Based on Three-Dimensional Hierarchical Graphene Aerogels with Periodic Macropores," Nano Letts. 16.6 (2016): pp. 3448-3456.

Zhu et al., "Highly compressible 3D periodic graphene aerogel microlattices," Nat. Commun. 6 (2015): 6962, pp. 1-8.

\* cited by examiner

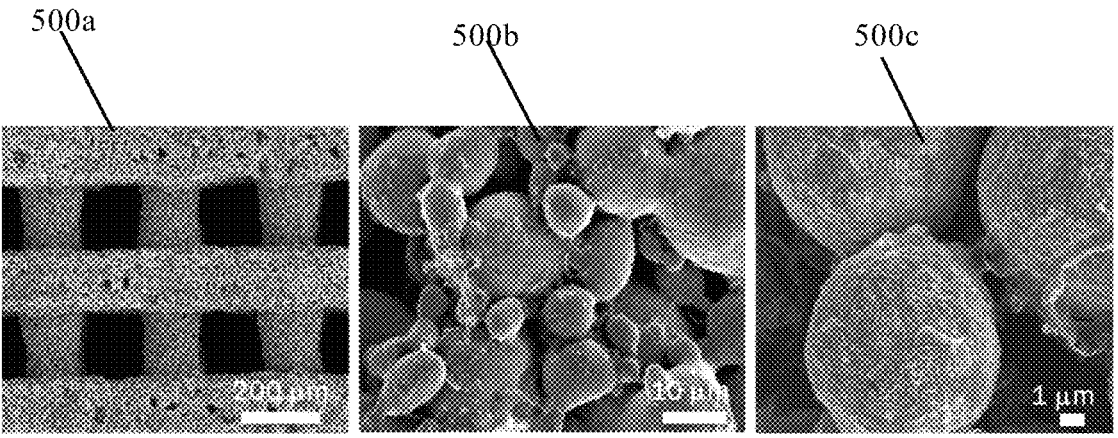
FIG. 5A    FIG. 5B    FIG. 5C
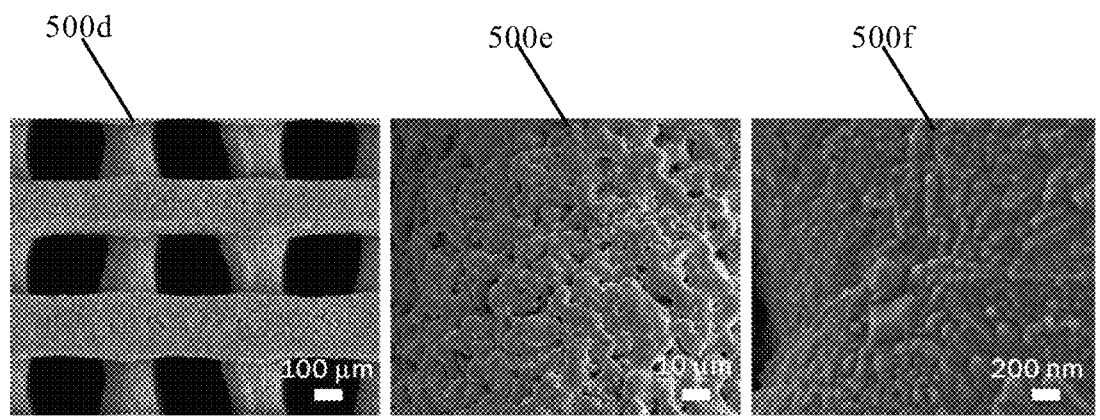
FIG. 5D    FIG. 5E    FIG. 5F

FABRICATION OF 3D-PRINTED COPPER BASED ZINC ANODES

STATEMENT AS TO RIGHTS TO APPLICATIONS MADE UNDER FEDERALLY SPONSORED RESEARCH AND DEVELOPMENT

This invention was made with Government support under Contract No. DE-AC52-07NA27344 awarded by the United States Department of Energy. The Government has certain rights in the invention.

BACKGROUND

Field of Endeavor

The present disclosure relates to additive manufacturing and more particularly to apparatus, systems, and methods for fabrication of a porous copper-zinc structure.

State of Technology

This section provides background information related to the present disclosure which is not necessarily prior art.

Zinc is an earth-abundant metal that has been used as a potential "beyond lithium" material for its high theoretical capacity, low redox potential, and good water compatibility. Therefore, it can be directly used as cheap anode for its high reversibility in aqueous zinc-based batteries. However, detrimental dendrites, corrosion, and hydrogen evolution are main issues causing the anode degradation during cycling. Especially, the dead zinc from falling dendrites exacerbates localized uneven electric field and ions migration inducing even worse side reactions. Therefore, dendrite-free zinc anodes have become the prerequisite for the long-life batteries.

Conventional Zn foils or plates always suffer from quick passivation without full utilization of excess active materials leading to a low energy density. Several 3D current collectors have been created to support Zn, such as carbons (i.e., graphene foam, carbon nanotube networks), and metals (i.e., nickel foam, porous copper, steel mesh). However, these scaffolds add extra weight and have interfacial affinity problems with deposited zinc. Recently, 3D pure Zn anodes including wires, sponges, foams, nanosheets, and nanoporous monoliths and alloys have also been developed, whereas their randomly porous structures impede the mass transfer of electrolyte and considerably increases the ion transfer distance.

Additive manufacturing is a category of freeform fabrication techniques that build 3D structures by sequentially layering one material on top of another in a desired pattern. The direct ink writing is one of extrusion-based additive manufacturing methods that employ a computer-controlled translation stage to deposit customized "inks" through a print head into programmed designs. The patterns are generated by stacking 2D layers consisting of simple, one-dimensional filaments to complex, 3D structures. The inks are administered through micro-nozzles, and filament diameter is determined by nozzle size, print speed, and rates of ink flow and solidification. Here, we develop a new colloidal-based zinc ink to print self-supported 3D anodes with designed internal structure show greater degree of freedom to regulate the electron transfer kinetics, ion flux, and nucleation barrier and sites.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors' apparatus, systems, and methods provide the production of a porous copper-zinc structure, including providing copper ink, creating a 3D model of the porous copper-zinc structure, 3D printing the copper ink into a porous copper lattice structure using the 3D model, heat treatment of the porous copper lattice structure producing a heat treated porous copper lattice structure, surface modification of the heat treated porous copper lattice structure by nanowires growth on the heat treated porous copper lattice structure producing a heat treated porous copper lattice structure with nanowires, and electrodeposition of zinc onto the heat treated porous copper lattice structure with nanowires to produce the porous copper-zinc structure.

In one embodiment the inventors' apparatus, systems, and methods produce architected zinc anodes by additive manufacturing. Copper inks are developed to print conductive scaffolds as current collectors and then zinc nanosheets are electrodeposited. The inventors' architected zinc anodes have use in energy storage, particularly supercapacitors, hybrid supercapacitors, and zinc batteries.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serves to explain the principles of the apparatus, systems, and methods.

FIGS. 5A-5F illustrate details of heat treatment of copper green body identified as step 105 in FIG. 1.

DETAILED DESCRIPTION OF SPECIFIC EMBODIMENTS

Figure 1:
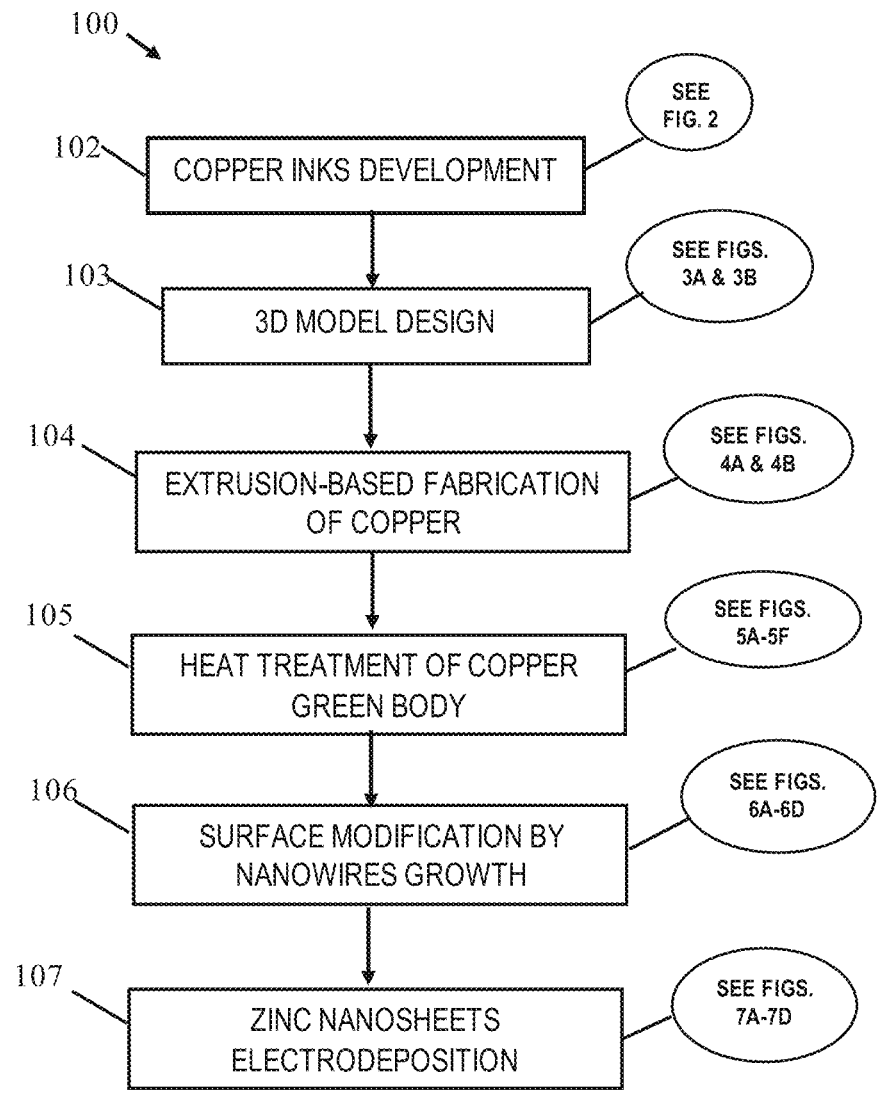
FIG. 1 is a flow chart that illustrates one embodiment of the inventors' apparatus, systems, and methods for fabrication of 3D-printed copper based zinc anodes.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

In various embodiments the inventors' apparatus, systems, and methods provide the production of a porous copper-zinc structure. In various embodiments the apparatus, systems, and methods include the steps of providing copper ink, creating a 3D model of the porous copper-zinc structure, 3D printing the copper ink into a porous copper lattice structure using the 3D model to 3D print the porous copper-zinc structure, heat treatment of the porous copper lattice structure producing a heat treated porous copper lattice structure, surface modification of the heat treated porous copper lattice structure by nanowires growth on the heat treated porous copper lattice structure producing a heat treated porous copper lattice structure with nanowires, and electrodeposition of zinc onto the heat treated porous copper lattice structure with nanowires to produce the porous copper-zinc structure.

In one embodiment the inventors' apparatus, systems, and methods produce architected zinc anodes by additive manufacturing. Copper inks are developed to print conductive scaffolds as current collectors and then zinc nanosheets are electrodeposited. The inventors' architected zinc anodes have use in energy storage, particularly supercapacitors, hybrid supercapacitors, and zinc batteries. Zinc-ion batteries have the benefits of: "power capability and compactness to supplant lithium-ion for renewable energy storage," "water-based chemistry which is intrinsically safe and non-flammable," "use of zinc, which is abundant and inexpensive," "solves the supply chain issues facing lithium-ion," and "significant cost reductions." The inventors' new Zn Anode has benefits of: using 3D printable ink, being structurally robust, not oxidized during printing and annealing, and tailorable with respect to Zn to ZnO ratio.

Referring now to FIG. 1, a flow chart illustrates one embodiment of the inventors' apparatus, systems, and methods for producing architected zinc anodes. The flow charter is designated generally by the reference numeral 100. As illustrated in the flow charter 100, the system includes a number of steps. The steps in FIG. 1 are identified and described below.

Step 102—COPPER INK DEVELOPMENT (Reference numeral 102)—A copper ink is developed in step 102. Note that FIG. 1 includes a side bar figure directing attention to FIG. 2 for additional details of step 102.

Step 103—3D MODEL DESIGN (Reference numeral 103)—In step 103, a 3D model is designed. Note that FIG. 1 includes a side bar figure directing attention to FIG. 3 for additional details of step 103.

Step 104—EXTRUSION-BASED FABRICATION OF COPPER (Reference numeral 104)—Step 104 is the 3D printing of copper lattices. Note that FIG. 1 includes a side bar figure directing attention to FIG. 4 for additional details of step 104.

Step 105—HEAT TREATMENT OF COPPER GREEN BODY (Reference numeral 105)—Step 105 is the heat treatment of the copper green body. Note that FIG. 1 includes a side bar figure directing attention to FIG. 5 for additional details of step 105.

Step 106—SURFACE MODIFICATION BY NANOWIRES GROWTH (Reference numeral 106)—Step 106 is surface modification by nanowires growth. Note that FIG. 1 includes a side bar figure directing attention to FIG. 6 for additional details of step 106.

Step 107—ZINC NANOSHEETS ELECTRODEPOSITION (Reference numeral 107)—Step 107 is Zinc Nanosheets Electrodeposition. Note that FIG. 1 includes a side bar figure directing attention to FIG. 7 for additional details of step 107.

The steps of the inventor's apparatus, systems, and methods 100 having been identified and described in FIG. 1, the operation and details of the system 100 illustrated in FIG. 1 will now be considered. The inventors' apparatus, systems, and methods 100 provide a method of producing a zinc anode that includes the steps of providing copper ink, creating a 3D model of the zinc anode, 3D printing the copper ink into a porous copper lattice structure using the 3D model, heat treatment of the porous copper lattice structure producing a heat treated porous copper lattice structure, surface modification of the heat treated porous copper lattice structure by nanowires growth on the heat treated porous copper lattice structure producing a heat treated porous copper lattice structure with nanowires, and electrodeposition of zinc onto the heat treated porous copper lattice structure with nanowires to produce the zinc anode.

Figure 2:
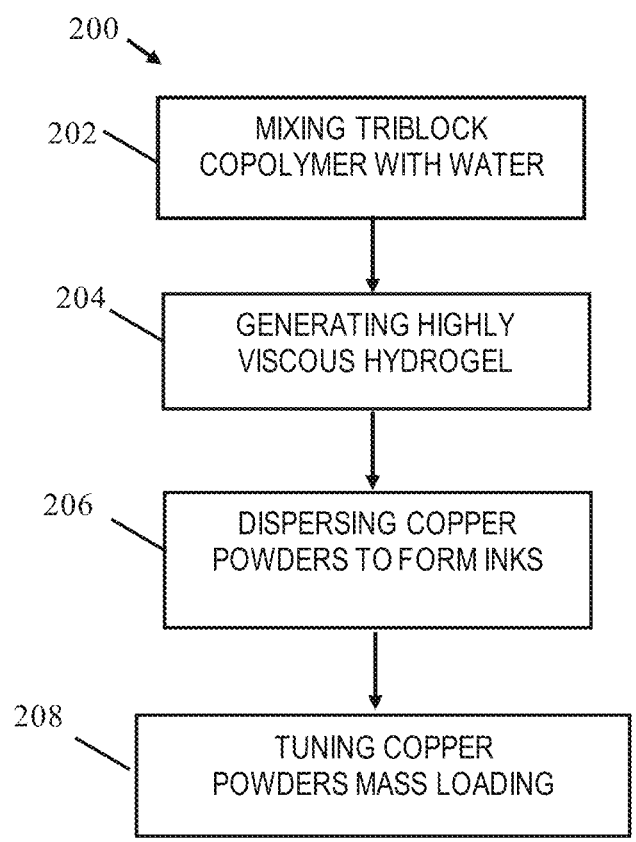
FIG. 2 is a flow diagram that illustrates the steps of copper inks development identified as step 102 in FIG. 1.

Referring now to FIG. 2 a flow diagram illustrates the step 102 of copper ink development. FIG. 1 includes a side bar figure directing attention to FIG. 2 for additional details of step 102. The step 102 of copper ink development includes a step of mixing triblock copolymer with water, a step of generating highly viscous hydrogel, a step of dispersing copper powders to form ink, and a step of tuning the copper powders for mass loading.

As illustrated in FIG. 2, the step 102 of copper ink development includes step 202 of mixing triblock copolymer with water. As illustrated in FIG. 2, the step 102 of copper ink development further includes step 204 of generating highly viscous hydrogel. As illustrated in FIG. 2, the step 102 of copper ink development includes step 206 of dispersing copper powders to form ink. As illustrated in FIG. 2, the step 102 of copper ink development includes step 208 of tuning the copper powders for mass loading.

Figure 3A:
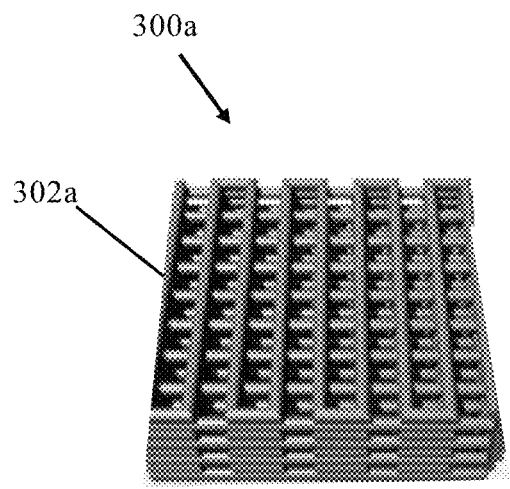
FIGS. 3A and 3B illustrate details of the 3D model design identified as step 103 in FIG. 1.
Figure 3B:
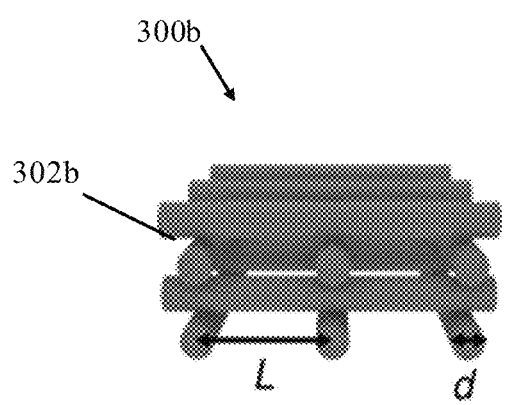

Referring now to FIG. 3A and FIG. 3B, the step 103 of 3D model design is illustrated. FIG. 1 includes a side bar figure directing attention to FIGS. 3A and 3B for additional details of step 103. In step 103 a 3D model is designed. The 3D geometrical model is designed using computer aided design (CAD) software or other systems for creating a digital model. FIGS. 3A and 3B illustrate details of the 3D model design identified as step 103 in FIG. 1. FIG. 3A is a schematic illustration of the designed 3D lattice produced by the step of 3D model design. The designed 3D lattice is designated generally by the reference numeral 300a. The designed 3D lattice 300a includes stacked parallel elements 302a with multiple layers.

FIG. 3B is conceptual illustration of step 103 creating a 3D model. FIG. 3B shows a wood pile lattice 300b with stacked parallel elements 302b having a filament diameter of d and a spacing of L. The wood pile lattice 300b is an additive manufacturing method for creating a 3D lattice.

Figure 4A:
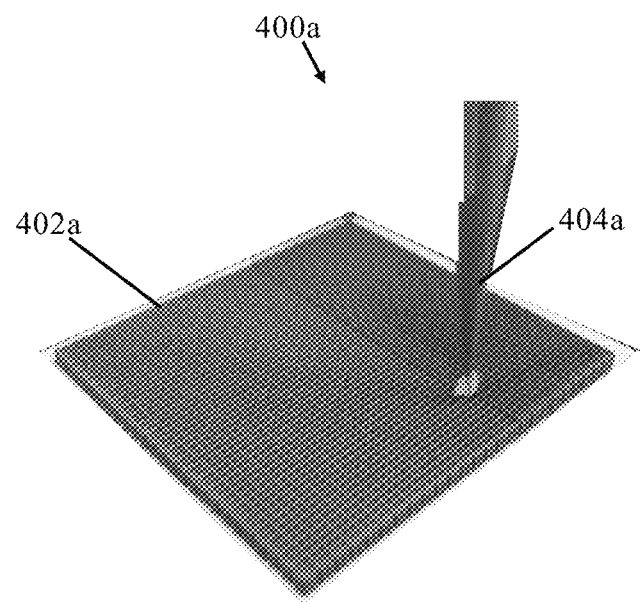
FIGS. 4A and 4B illustrate details of extrusion-based fabrication of copper identified as step 104 in FIG. 1.
Figure 4B:
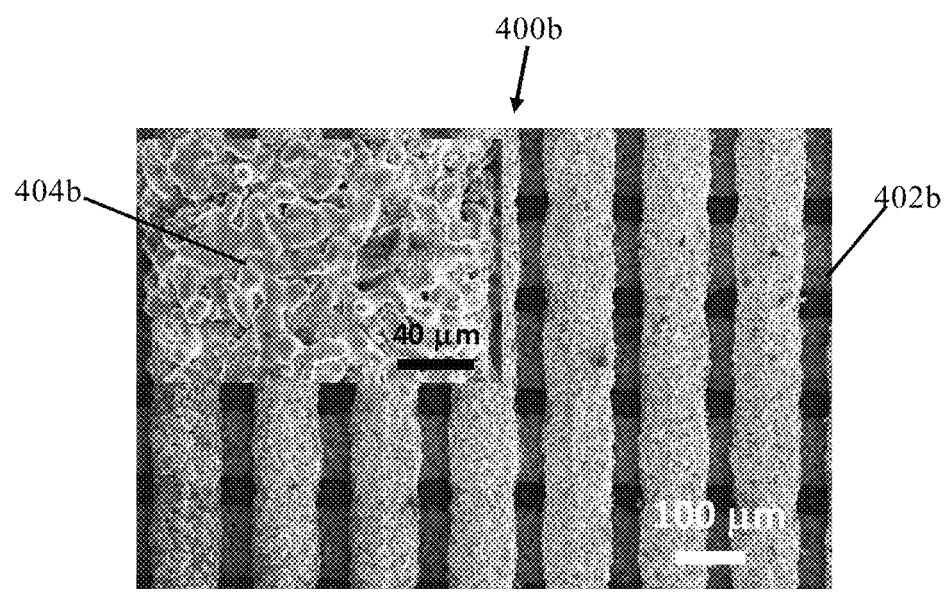

Referring now to FIG. 4A and FIG. 4B, the step 104 of extrusion-based fabrication of copper is illustrated. FIG. 1 includes a side bar figure directing attention to FIGS. 4A and 4B for additional details of step 104. Step 104 provides extrusion-based fabrication of copper. FIGS. 4A and 4B illustrate details of the extrusion-based fabrication of copper identified as step 104 in FIG. 1. FIG. 4A is a schematic illustration of real-time 3D printing of copper lattices. The 3D printing of copper lattices is designated generally by the reference numeral 400a. The 3D lattice 402a is produced by an additive manufacturing moveable print head 404a for printing the copper lattice 402a. FIG. 3B is a high-resolution illustration of the printing of a copper lattice 402b with controlled feature size 404b below 100 microns.

Referring now to FIG. 5A-FIG. 5F, the step 105 of heat treatment of copper green body is illustrated. FIG. 1 includes a side bar figure directing attention to FIGS. 5A and 5B for additional details of step 105. Step 105 provides heat treatment of copper green body. FIGS. 5A-5F illustrate details of the heat treatment of copper green body identified as step 105 in FIG. 1. FIGS.

FIGS. 5A-5C show the 3D printed copper lattice heated at a lower temperature. FIG. 5A is a photomicrograph showing the heat treatment of copper green body at 200 µm. FIG. 5B is a photomicrograph showing the heat treatment of copper green body at 10 µm. FIG. 5C is a photomicrograph showing the heat treatment of copper green body at 1 µm.

FIGS. 5D-5F show the 3D printed copper lattice heated at a higher temperature. FIG. 5D is a photomicrograph showing the heat treatment of copper green body at 100 µm. FIG. 5E is a photomicrograph showing the heat treatment of copper green body at 10 µm. FIG. 5F is a photomicrograph showing the heat treatment of copper green body at 1 µm.

Referring now to FIG. 6A-6D, the step 106 of surface modification by nanowires growth is illustrated. FIG. 1 includes a side bar figure directing attention to FIGS. 6A-6D for additional details of step 106. Step 106 provides surface modification by nanowires growth. FIGS. 6A-6D illustrate details of the surface modification by nanowires growth identified as step 106 in FIG. 1.

Figures 6A, 6B, 6C, 6D:
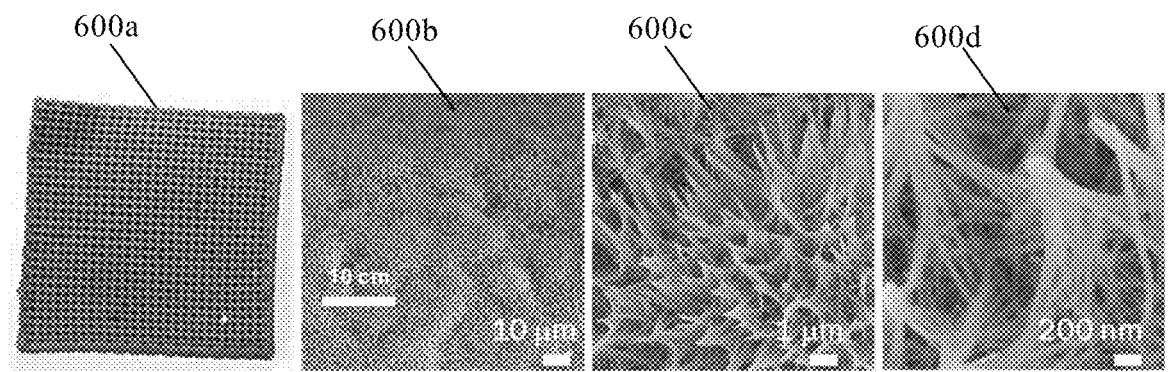
FIGS. 6A-6D illustrates details of surface modification by nanowires growth identified as step 106 in FIG. 1.

FIGS. 6A-6D show the 3D surface modification by nanowires growth. FIG. 6A shows the copper matrix 602a with nanowires provided by step 106 surface modification by nanowires growth. In FIG. 6A, an illustrative view shows electrochemical oxidation to grow copper (oxide) nanowires on the surface of the 3D printed copper matrix 600a. FIG. 6B is a photomicrograph showing the electrochemical oxidation to grow copper (oxide) nanowires on the surface of the 3D printed copper matrix 600b at 10 µm. FIG. 6C is a photomicrograph showing the electrochemical oxidation to grow copper (oxide) nanowires on the surface of the 3D printed copper matrix 600c at 1 µm. FIG. 6D is a photomicrograph showing the electrochemical oxidation to grow copper (oxide) nanowires on the surface of the 3D printed copper matrix 600d at 200 nm.

Referring now to FIG. 7A-7D, the step 107 of Zinc Nanosheets Electrodeposition is illustrated. FIG. 1 includes a side bar figure directing attention to FIGS. 7A-7D for additional details of step 107. Step 107 provides zinc nanosheets electrodeposition. FIGS. 7A-7D illustrate details of the Zinc Nanosheets Electrodeposition identified as step 107 in FIG. 1.

Figures 7A, 7B, 7C, 7D:
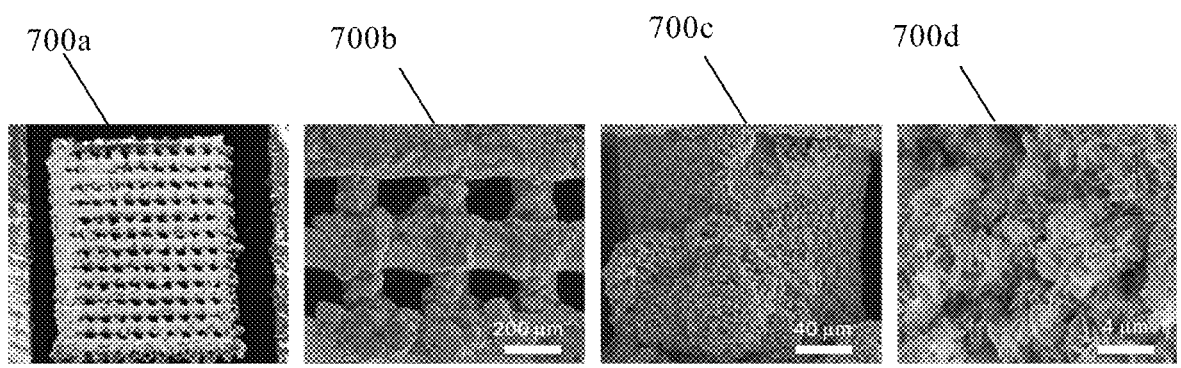
FIGS. 7A-7D illustrates details of zinc nanosheets electrodeposition identified as step 107 in FIG. 1.

FIGS. 7A-7D show the Zinc Nanosheets Electrodeposition. FIG. 7A shows the copper matrix 702a with zinc nanosheets electrodeposition provided by step 107. In FIG. 7A, an illustrative view shows copper matrix 702a with zinc nanosheets electrodeposition. FIG. 7B is a photomicrograph showing the copper matrix 702a with zinc nanosheets electrodeposition of the 3D printed copper matrix 700b at 200 µm. FIG. 7C is a photomicrograph showing the copper matrix 702a with zinc nanosheets electrodeposition of the 3D printed copper matrix 700b at 40 µm. FIG. 7D is a photomicrograph showing the copper matrix 702a with zinc nanosheets electrodeposition of the 3D printed copper matrix 700b at 4 nm.

In various other embodiments the inventors' apparatus, systems, and methods provide the production of a porous copper-zinc structure, including providing copper ink, creating a 3D model of the porous copper-zinc structure, 3D printing the copper ink into a porous copper lattice structure using the 3D model, heat treatment of the porous copper lattice structure producing a heat treated porous copper lattice structure, surface modification of the heat treated porous copper lattice structure by nanowires growth on the heat treated porous copper lattice structure producing a heat treated porous copper lattice structure with nanowires, and electrodeposition of zinc onto the heat treated porous copper lattice structure with nanowires to produce the porous copper-zinc structure. The provision of copper ink includes mixing triblock copolymer with water. The provision of copper ink includes generating highly viscous hydrogel. The provision of copper ink includes dispersing copper powders to form ink. The provision of copper ink includes tuning copper powders for mass loading. The provision of copper ink includes a step of mixing triblock copolymer with water, a step of generating highly viscous hydrogel, a step of dispersing copper powders to form ink, and a step of tuning the copper powders for mass loading. The provision of a porous copper-zinc structure includes a step of using computer aided design software or other systems for creating a digital model of the porous copper-zinc structure. The provision of a porous copper-zinc structure includes producing stacked parallel elements with multiple layers. The provision of a porous copper-zinc structure includes creating a 3D log pile model of the porous copper-zinc structure. The provision of a porous copper-zinc structure includes using an additive manufacturing moveable print head for 3D printing the copper ink into a porous copper lattice structure using the 3D model. The provision of a porous copper-zinc structure includes electrochemical oxidation to grow copper oxide nanowires on the heat-treated porous copper lattice structure. The provision of a porous copper-zinc structure includes zinc nanosheets on a heat-treated porous copper lattice structure.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each, and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A method of producing a porous copper-zinc structure, comprising the steps of:
   providing copper ink,
   creating a 3D model of the porous copper-zinc structure wherein said step of creating a 3D model of the porous copper-zinc structure includes producing stacked parallel elements with multiple layers and creating a 3D log pile model of the porous copper-zinc structure,
   3D printing said copper ink into a porous copper lattice structure using said 3D model producing stacked parallel elements with multiple layers and a 3D log pile,
   heat treatment of said porous copper lattice structure producing a heat treated porous copper lattice structure having stacked parallel elements with multiple layers and a 3D log pile,
   surface modification of said heat treated porous copper lattice structure by nanowires growth on said heat treated porous copper lattice structure producing a heat treated porous copper lattice structure with nanowires having stacked parallel elements with multiple layers and a 3D log pile, and
   electrodeposition of zinc onto said heat treated porous copper lattice structure with nanowires to produce the porous copper-zinc structure having stacked parallel elements with multiple layers and a 3D log pile.

2. The method producing a porous copper-zinc structure of claim 1 wherein said step of providing copper ink includes a step of mixing triblock copolymer with water.

3. The method producing a porous copper-zinc structure of claim 1 wherein said step of providing copper ink includes a step of generating highly viscous hydrogel.

4. The method producing a porous copper-zinc structure of claim 1 wherein said step of providing copper ink includes a step of dispersing copper powders to form ink.

5. The method producing a porous copper-zinc structure of claim 4 wherein said step of providing copper ink includes a step of tuning said copper powders for mass loading.

6. The method producing a porous copper-zinc structure of claim 1 wherein said step of providing copper ink includes
   a step of mixing triblock copolymer with water,
   a step of generating highly viscous hydrogel,
   a step of dispersing copper powders to form ink, and
   a step of tuning said copper powders for mass loading.

7. The method producing a porous copper-zinc structure of claim 1 wherein said step of creating a 3D model of the porous copper-zinc structure includes a step of using computer aided design software or other systems for creating a digital model of the porous copper-zinc structure.

8. The method producing a porous copper-zinc structure of claim 1 wherein said step of 3D printing said copper ink into a porous copper lattice structure using said 3D model includes using an additive manufacturing moveable print head for 3D printing said copper ink into a said porous copper lattice structure using said 3D model.

9. The method producing a porous copper-zinc structure of claim 1 wherein said step of surface modification of said heat treated porous copper lattice structure by nanowires growth on said heat treated porous copper lattice structure includes electrochemical oxidation to grow copper oxide nanowires on said heat treated porous copper lattice structure.

10. The method producing a porous copper-zinc structure of claim 1 wherein said step of electrodeposition of zinc onto said heat treated porous copper lattice structure with nanowires includes zinc nanosheets on a said heat-treated porous copper lattice structure.

11. A method of producing a zinc anode, comprising the steps of:
    providing copper ink,
    creating a 3D model of the zinc anode wherein said step of creating a 3D model of the zinc anode includes producing stacked parallel elements with multiple layers and creating a 3D log pile model of the zinc anode,
    3D printing said copper ink into a porous copper lattice structure using said 3D model producing stacked parallel elements with multiple layers and a 3D log pile of the zinc anode,
    heat treatment of said porous copper lattice structure producing a heat treated porous copper lattice structure having stacked parallel elements with multiple layers and a 3D log pile of the zinc anode,
    surface modification of said heat treated porous copper lattice structure by nanowires growth on said heat treated porous copper lattice structure producing a heat-treated porous copper lattice structure with nanowires having stacked parallel elements with multiple layers and a 3D log pile of the zinc anode, and
    electrodeposition of zinc onto said heat treated porous copper lattice structure with nanowires to produce the zinc anode having stacked parallel elements with multiple layers and a 3D log pile of the zinc anode.

12. The method producing a zinc anode of claim 11 wherein said step of providing copper ink includes a step of mixing triblock copolymer with water.

13. The method producing a zinc anode of claim 11 wherein said step of providing copper ink includes a step of generating highly viscous hydrogel.

14. The method producing a zinc anode of claim 11 wherein said step of providing copper ink includes a step of dispersing copper powders to form ink.

15. The method producing a zinc anode of claim 14 wherein said step of providing copper ink includes a step of tuning said copper powders for mass loading.

16. The method producing a zinc anode of claim 11 wherein said step of providing copper ink includes
    a step of mixing triblock copolymer with water,
    a step of generating highly viscous hydrogel,
    a step of dispersing copper powders to form ink, and
    a step of tuning said copper powders for mass loading.

17. The method producing a zinc anode of claim 11 wherein said step of creating a 3D model of the zinc anode includes a step of using computer aided design software or other systems for creating a digital model of the zinc anode.

18. The method producing a zinc anode of claim 11 wherein said step of 3D printing said copper ink into a porous copper lattice structure using said 3D model includes using an additive manufacturing moveable print head for 3D printing said copper ink into a said porous copper lattice structure using said 3D model.

19. The method producing a zinc anode of claim 11 wherein said step of surface modification of said heat treated porous copper lattice structure by nanowires growth on said heat treated porous copper lattice structure includes electrochemical oxidation to grow copper oxide nanowires on said heat treated porous copper lattice structure.

20. The method producing a zinc anode of claim 11 wherein said step of electrodeposition of zinc onto said heat treated porous copper lattice structure with nanowires includes zinc nanosheets on a said heat-treated porous copper lattice structure.

\* \* \* \* \*